US 7,487,944 B2

(12) United States Patent
Tisbo et al.

(10) Patent No.: US 7,487,944 B2
(45) Date of Patent: Feb. 10, 2009

(54) FLAT SCREEN MONITOR DESKTOP SUPPORT

(75) Inventors: Peter Tisbo, Elk Grove Village, IL (US); David Phillips, Elk Grove Village, IL (US)

(73) Assignee: Custom Plastics, Inc., Elk Grove Village, IL (US)

( * ) Notice: Subject to any disclaimer, the term of this patent is extended or adjusted under 35 U.S.C. 154(b) by 63 days.

(21) Appl. No.: 11/150,690

(22) Filed: Jun. 11, 2005

(65) Prior Publication Data

US 2005/0284997 A1 Dec. 29, 2005

Related U.S. Application Data

(60) Provisional application No. 60/579,038, filed on Jun. 11, 2004.

(51) Int. Cl.
*A47F 5/00* (2006.01)
(52) U.S. Cl. .............................. 248/288.51; 248/289.11
(58) Field of Classification Search ............. 248/122.1, 248/124.2, 125.7, 125.9, 288.51, 289.11, 248/291.1, 292.13, 231.71, 316.1, 281.11, 248/282.1, 284.1, 130, 131, 132, 145, 408, 248/411, 162.1; 16/252, 324
See application file for complete search history.

(56) References Cited

U.S. PATENT DOCUMENTS

| | | | | |
|---|---|---|---|---|
| 4,097,958 A | * | 7/1978 | Van Dell | 16/225 |
| 4,307,672 A | | 12/1981 | Shikimi | |
| 4,310,136 A | | 1/1982 | Mooney | |
| 4,438,458 A | | 3/1984 | Munscher | |
| 4,447,031 A | | 5/1984 | Souder, Jr. et al. | |
| 4,526,336 A | | 7/1985 | Durivault et al. | |
| 4,545,555 A | * | 10/1985 | Koch | 248/280.11 |
| 4,687,167 A | | 8/1987 | Skalka et al. | |
| 4,836,486 A | * | 6/1989 | Vossoughi et al. | 248/281.11 |
| 4,844,387 A | * | 7/1989 | Sorgi et al. | 108/5 |
| 4,919,387 A | | 4/1990 | Sampson | |
| 4,987,690 A | * | 1/1991 | Aaldenberg et al. | 40/341 |
| D323,323 S | | 1/1992 | Klaebel | |
| D325,868 S | | 5/1992 | Bartok | |
| 5,123,621 A | * | 6/1992 | Gates | 248/281.11 |
| 5,125,727 A | | 6/1992 | Lechman et al. | |
| 5,154,390 A | * | 10/1992 | Bain et al. | 248/447.2 |
| 5,170,975 A | * | 12/1992 | Chadwick | 248/284.1 |
| 5,254,059 A | | 10/1993 | Arthur et al. | |
| 5,277,392 A | | 1/1994 | Rossman et al. | |
| 5,318,490 A | * | 6/1994 | Henderson et al. | 482/53 |
| 5,370,570 A | * | 12/1994 | Harris | 446/227 |
| 5,437,235 A | | 8/1995 | Randolph | |
| 5,553,820 A | | 9/1996 | Karten et al. | |
| 5,664,750 A | * | 9/1997 | Cohen | 248/231.71 |

(Continued)

*Primary Examiner*—A. Joseph Wujciak, III
(74) *Attorney, Agent, or Firm*—McHale & Slavin, P.A.

(57) ABSTRACT

The instant invention provides a flat screen monitor support assembly having a base that is coupled to the edge of a desk, or to a grommet hole in a desk. A distal end of the monitor support assembly is securable to the back of the flat screen monitor. Torsilastic assemblies allow for adjustment of the biasing required to maintain the vertical spacing of the monitor from the desktop surface with pivot pins providing horizontal rotation. The torsilastic assemblies accommodate monitors of different weight as well as normal aging of the elastomeric elements within the assemblies. The support base further includes an offset pivot providing additional rotation aspects without the need for support bracket movement.

6 Claims, 5 Drawing Sheets

U.S. PATENT DOCUMENTS

| | | | |
|---|---|---|---|
| 5,713,549 A * | 2/1998 | Shieh .................... 248/284.1 |
| 5,758,934 A | 6/1998 | Flutka et al. |
| 5,791,259 A | 8/1998 | Mansfield et al. |
| 5,799,917 A * | 9/1998 | Li ......................... 248/284.1 |
| 6,208,505 B1 | 3/2001 | Kuchta et al. |
| 6,209,835 B1 | 4/2001 | Walrath et al. |
| 6,327,982 B1 | 12/2001 | Jackson |
| 6,337,720 B1 | 1/2002 | Ui |
| 6,464,185 B1 | 10/2002 | Minelli et al. |
| 6,478,275 B1 * | 11/2002 | Huang .................. 248/284.1 |
| 6,592,090 B1 * | 7/2003 | Li ......................... 248/284.1 |
| 6,663,064 B1 | 12/2003 | Minelli et al. |
| 6,672,553 B1 * | 1/2004 | Lin ....................... 248/276.1 |
| 6,726,167 B2 | 4/2004 | Oddsen, Jr. |
| 6,769,657 B1 * | 8/2004 | Huang .................. 248/278.1 |
| 6,834,837 B2 * | 12/2004 | Schilt et al. ............ 248/284.1 |
| 6,854,698 B2 | 2/2005 | Oddsen, Jr. |
| 6,857,610 B1 * | 2/2005 | Conner et al. .......... 248/284.1 |
| 2003/0075653 A1 * | 4/2003 | Li ......................... 248/274.1 |
| 2005/0029849 A1 * | 2/2005 | Goetz et al. ............ 297/326 |

* cited by examiner

FLAT SCREEN MONITOR DESKTOP SUPPORT

RELATED APPLICATIONS

This application claims priority to Jun. 11, 2004, the filing date, of U.S. Provisional Application 60/579,038.

FIELD OF THE INVENTION

The field of the invention is monitor supports, and more particularly, a flat screen monitor support securable to a desktop having a TORSILASTIC, e.g. elastomeric torsion spring, coupling for positional placement of the monitor.

BACKGROUND OF THE INVENTION

Desktop computer systems have revolutionized the way industry operates. Such computer systems allow an individual to perform numerous tasks not thought possible a decade ago. One of the problems with desktop computers is that conventional desks were not designed to accommodate the extra hardware. The monitors were especially cumbersome as they consumed a great amount of desktop surface space. The introduction of flat screens for computer systems has greatly reduced the surface space demand, however, the space demand is not eliminated.

An advantage to the flat screen monitors is the minimal thickness and weight, allowing such monitors to be placed on cantilever type support arms. In this manner a monitor can literally float over the desktop and be positioned by an individual to provide optimal viewing of the monitor. When the monitor is not in use it may be moved to a storage position providing uninhibited access to the desktop.

Known prior art support arms include the use of counter weights or counter springs to support the weight of the monitor. See, for example, U.S. Pat. No. 5,437,235 to Randolph, which discloses a computer work station with a spring loaded folding frame that supports a monitor in a vertically adjustable position above the work surface. Counter-weight technology must be utilized to balance the load and, unless adjustment is provided, must be sized to meet the weight of the monitor. Similarly, the use of counter springs require adjustment for proper support, the springs can lose their bias over time causing the monitor to sag from a viewing position with no possibility of adjustment.

U.S. Pat. No. 4,687,167 to Skalka et al. discloses a horizontally adjustable pivoting computer support that is mounted to the edge of a desk or work station.

Thus, what is needed in the art is a desktop support for use in positioning an LCD or plasma monitor over the surface of a desk. The desktop support should be capable of maintaining the monitor in a fixed position without counterweights or counter springs as utilized in the prior art.

SUMMARY OF THE INVENTION

Disclosed is a flat screen monitor support assembly having a base that is coupled to the edge of a desk, or to a grommet hole in a desk. A distal end of the monitor support assembly is securable to the back of the flat screen monitor. A TORSILASTIC, e.g. elastomeric torsion spring assembly allows for adjustment of the biasing required to maintain the vertical spacing of the monitor from the desktop surface with pivot pins providing horizontal rotation. The support base further includes an offset pivot providing additional rotation aspects without the need for support bracket movement.

Thus, an objective of the instant invention is to provide a support for a flat screen monitor which can be turned in a horizontal access plane and a vertical access plane.

Still another objective of the instant invention is to provide a support for a flat screen monitor which can be securely positioned in a desired location when adjustment turning has stopped.

Still another objective of the instant invention is to provide a flat screen monitor support employing a TORSILASTIC, e.g. elastomeric torsion spring assembly which can be adjusted to compensate for different weight monitors as well as normal wear and tear.

Another objective of the invention is to provide an ergonomic support arm for flat screen monitors to minimize eye, neck, and back pain.

Still another objective of the instant invention is to provide a monitor support arm that allows for the vertical and horizontal movement of a monitor by simple hand movement.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
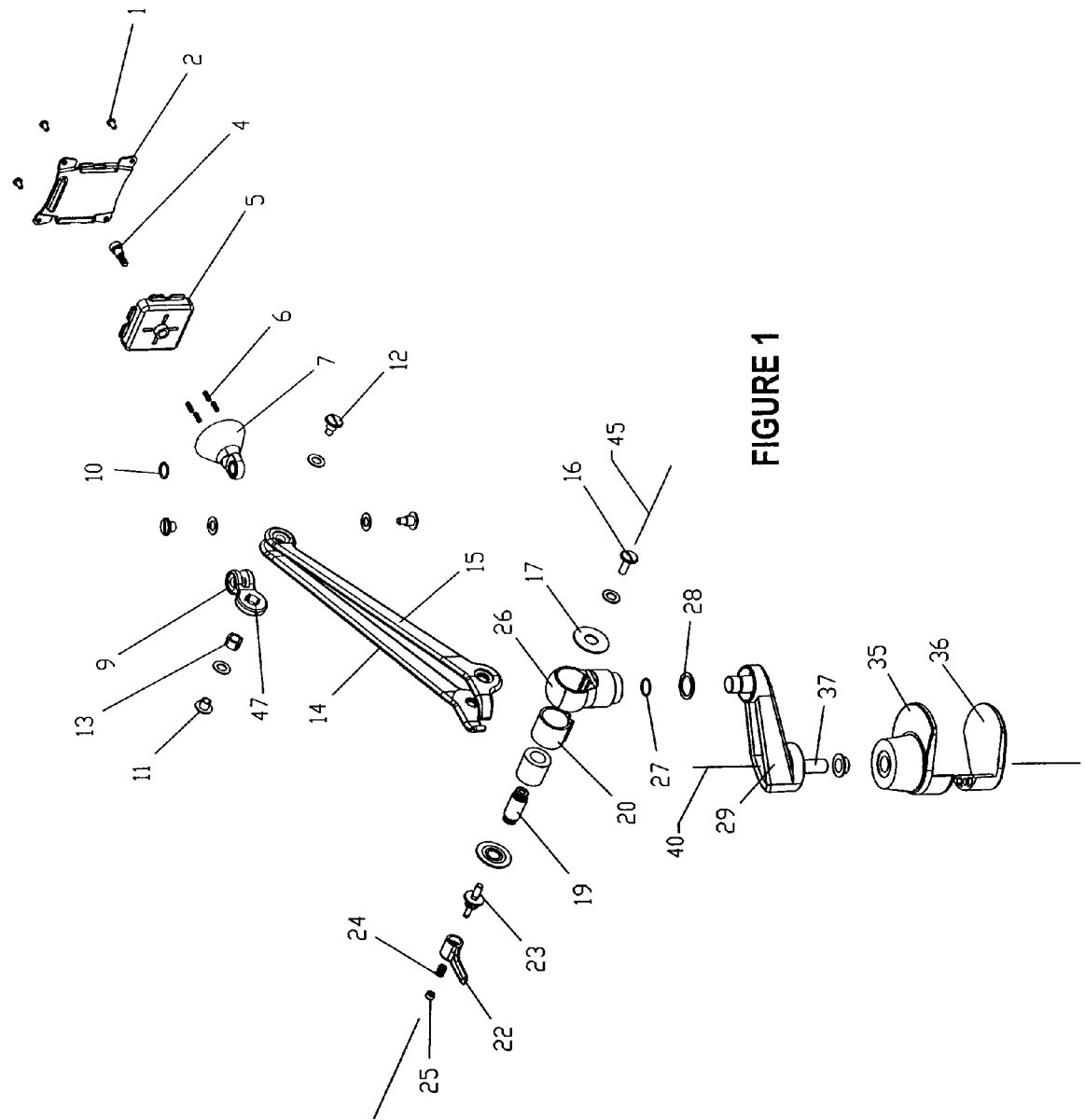
FIG. 1 is an exploded view of the flat screen support apparatus.

FIG. 1 depicts an exploded view of the monitor arm with mounting plate 2 which can either be 75×75 mm or 100×100 mm or other size suitable for use in attaching to the back of a flat screen monitor such as an LCD, LED or plasma screen via fasteners 1. The mounting plate is removably coupled to a swivel cone 7 by use of an interim mounting base 5. The mounting plate is secured to the cone with fastening screw 4. A plurality of spring pins 6 are removably secured within cone 7 so that they engage the rear surface of mounting base 5. The rear surface of the mounting base 5 includes indentations which cooperate with the spring pins to allow the monitor to be rotated and indexed about fourth axis 49. The swivel cone 7 is coupled to the upper arms 14 and 15 by use of the swivel arm 9. The swivel arm 9 includes a spaced apart second end portion allowing the aperture of the swivel cone 7 to be inserted between the spaced apart portions and secured in place with mounting components 10. This construction secures the cone in position, yet allows for horizontal movement about sixth axis 46.

Figure 4:
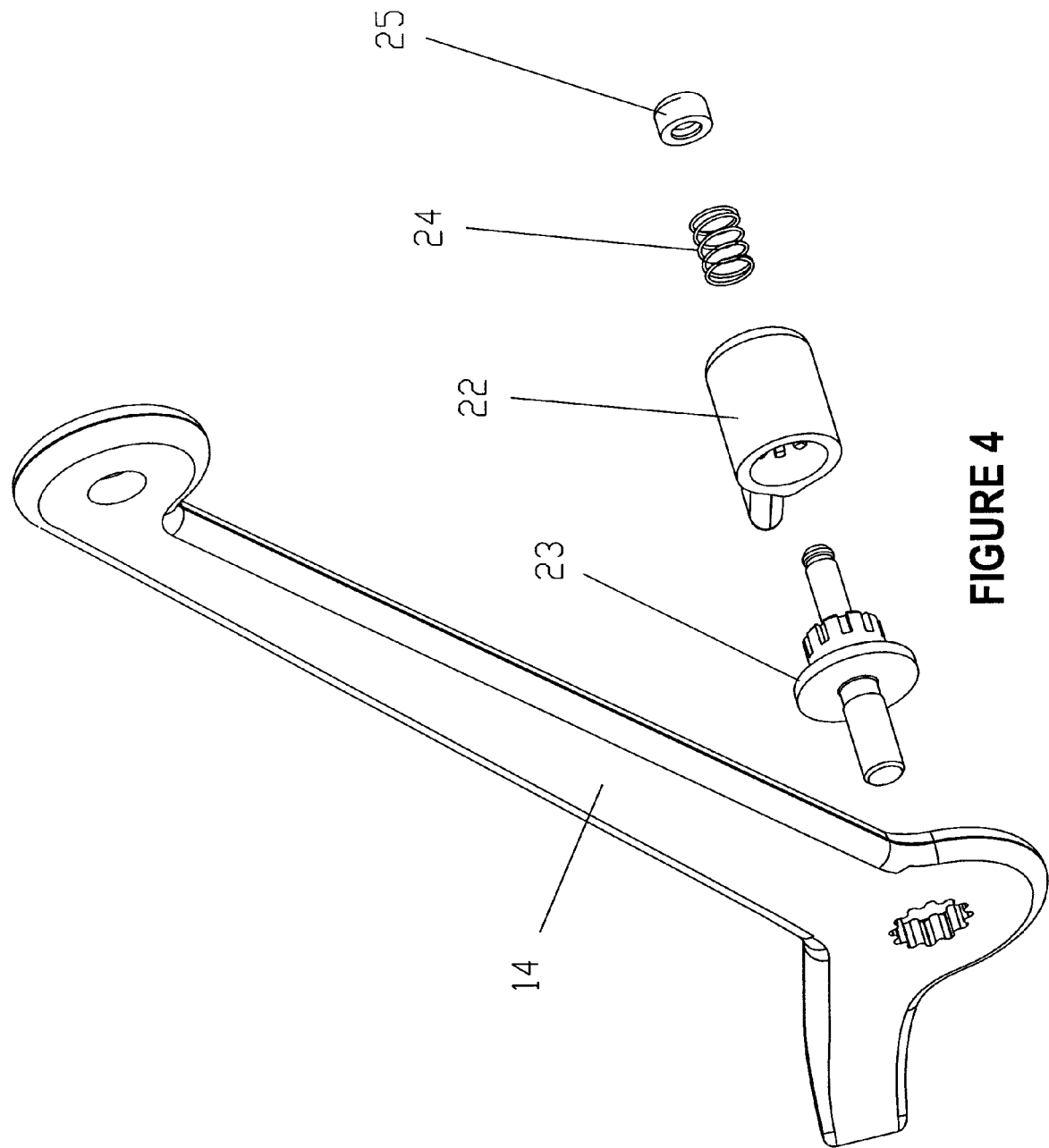
FIG. 4 is an exploded pictorial view of the lever mechanism.
Figure 5:
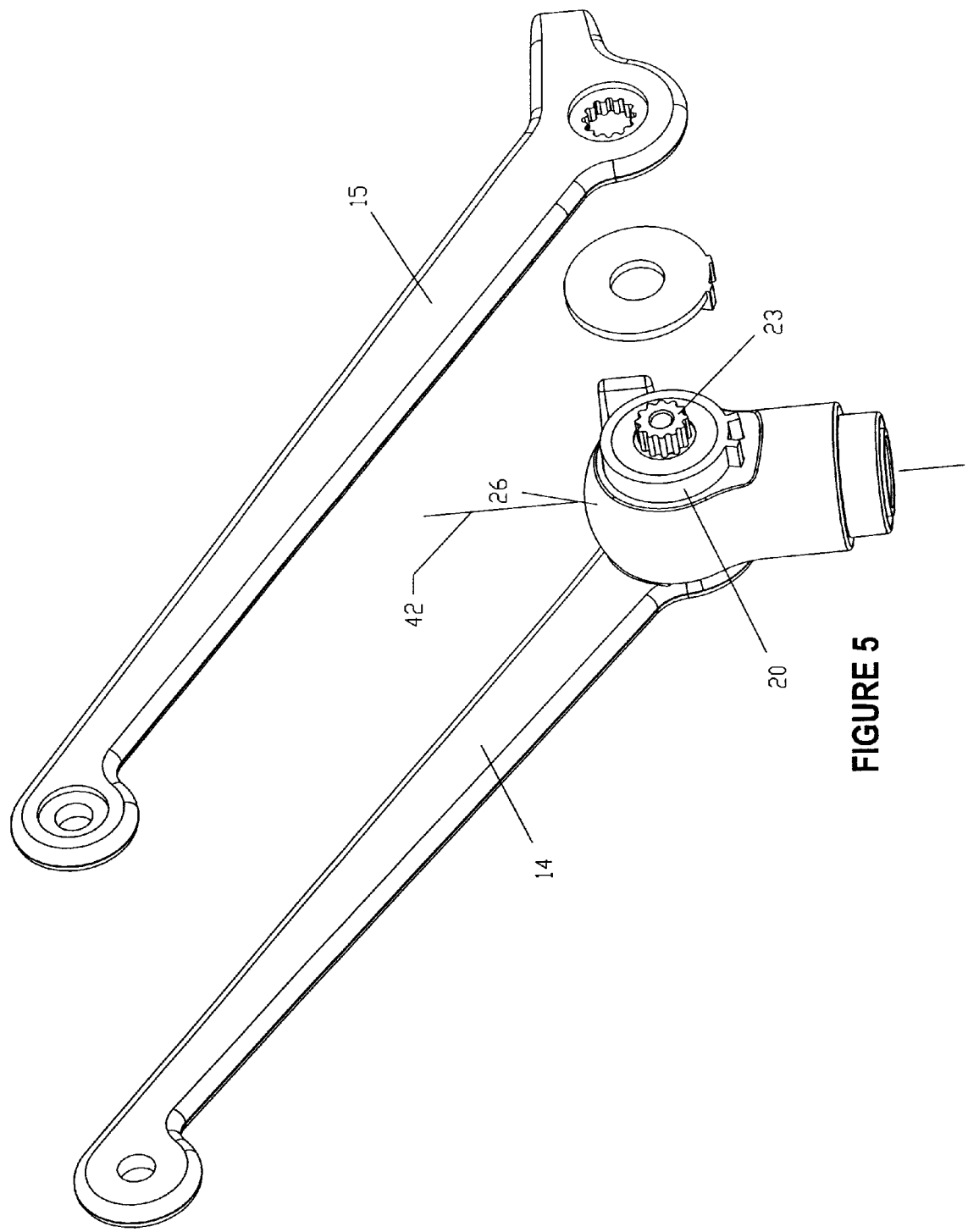
FIG. 5 is an exploded pictorial view of the knuckle.

The first end of the swivel arm 9 includes an aperture 47 formed perpendicular and positionable between the upper arms 14 and 15. The aperture 47 includes internal splines which are constructed and arranged to cooperate with a second TORSILASTIC, e.g. elastomeric torsion spring assembly 13. Fastener components 11 and 12 secure the swivel arm to the upper arms in a conventional manner. The swivel arm 9 connection to the arms 14 and 15 allows upward and downward rotation of the cone 7 about fifth axis 43. While the cones' connection to the swivel arm provides lateral movement to the mounting plate 2 and thus a monitor 100 (FIG. 2), the lower ends of the mounting arms 14 and 15 are coupled to a knuckle 26 by pinion 23, as shown in FIGS. 4 and 5, having a TORSILASTIC washer 17 securable to an outer TORSILASTIC bushing 20 and inner TORSILASTIC bushing 19. The TORSILASTIC, e.g. elastomeric torsion spring assembly includes a plurality of elastomeric elements to provide a biased positioning about second axis 43.

Joint connector 16 operates in conjunction with lever handle 22 for increasing or decreasing the applied pressure to the TORSILASTIC, e.g. elastomeric torsion spring assembly. Lever handle 22 includes an internal spline which cooperates with the spline formed on the outer surface of the pinion 23. Spring 24 and cap 25 cooperate with the first end of the pinion to secure the lever handle in place as well as allow the lever handle to be repositioned for operator convenience. The knuckle 26 is mounted to the lower arm 29 allowing rotation of the knuckle in a 360 pattern about first axis 42. The lower arm 29 is further coupled to an upper clamp 35 which is further coupled to a lower clamp 36. Clamps 35 and 36 are used to provide a rigid sandwich style coupling to an upper and lower surface of a table top. Lower arm 29 includes an offset pin 37 which is rotatably coupled to clamp 35 to allow for radial movement of the lower arm about third axis 40 in conjunction with radial movement of knuckle 26 about axis 42 for lateral offset positioning of the display device.

The TORSILASTIC, e.g. elastomeric torsion spring assemblies allow the monitor to be placed within various operator chosen positions by simply applying sufficient force to the monitor or other display device to overcome the resistance provided by TORSILASTIC, e.g. elastomeric torsion spring assemblies. In this manner the TORSILASTIC, e.g. elastomeric torsion spring assemblies allow for physical positioning of the monitor yet, the chosen position is maintained when no auxiliary force is applied to the display device. In addition, the construction of the TORSILASTIC, e.g. elastomeric torsion spring assemblies accommodate monitors of different weight as well as normal aging of the elastomeric elements within the assemblies.

Figure 2:
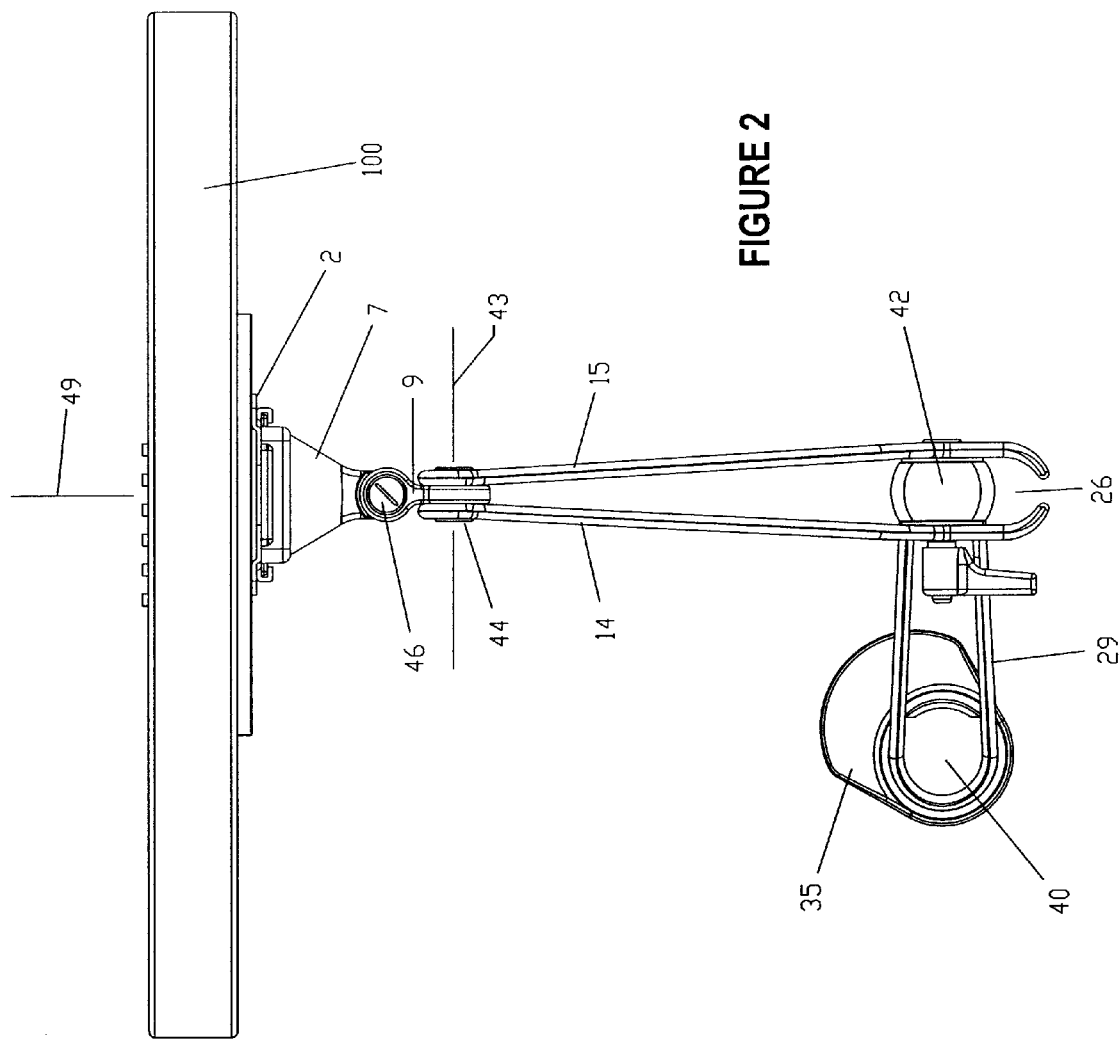
FIG. 2 is a top view of the flat screen support apparatus attached to a flat screen monitor.

Referring to FIGS. 1 and 2, a top view of the instant invention is illustrated with flat screen monitor 100 coupled to the mounting plate 2 shown with swivel cone 7. The device consists of the clamps 35 and 36 which are securable to a desk (not shown). The lower arm 29 is secured to clamp 35 for pivotal movement around third axis 40. A pivot point through knuckle 26 is defined by first axis 42 for rotational positioning of the upper arms 14 and 15. A pivot point through knuckle 26 is defined by second axis 43 allowing for vertical pivoting of arms 14 and 15. The swivel arm 9 further allows for vertical rotation of the cone 7 and thus the monitor around fifth axis 43 and horizontal rotation around sixth axis 46.

Figure 3:
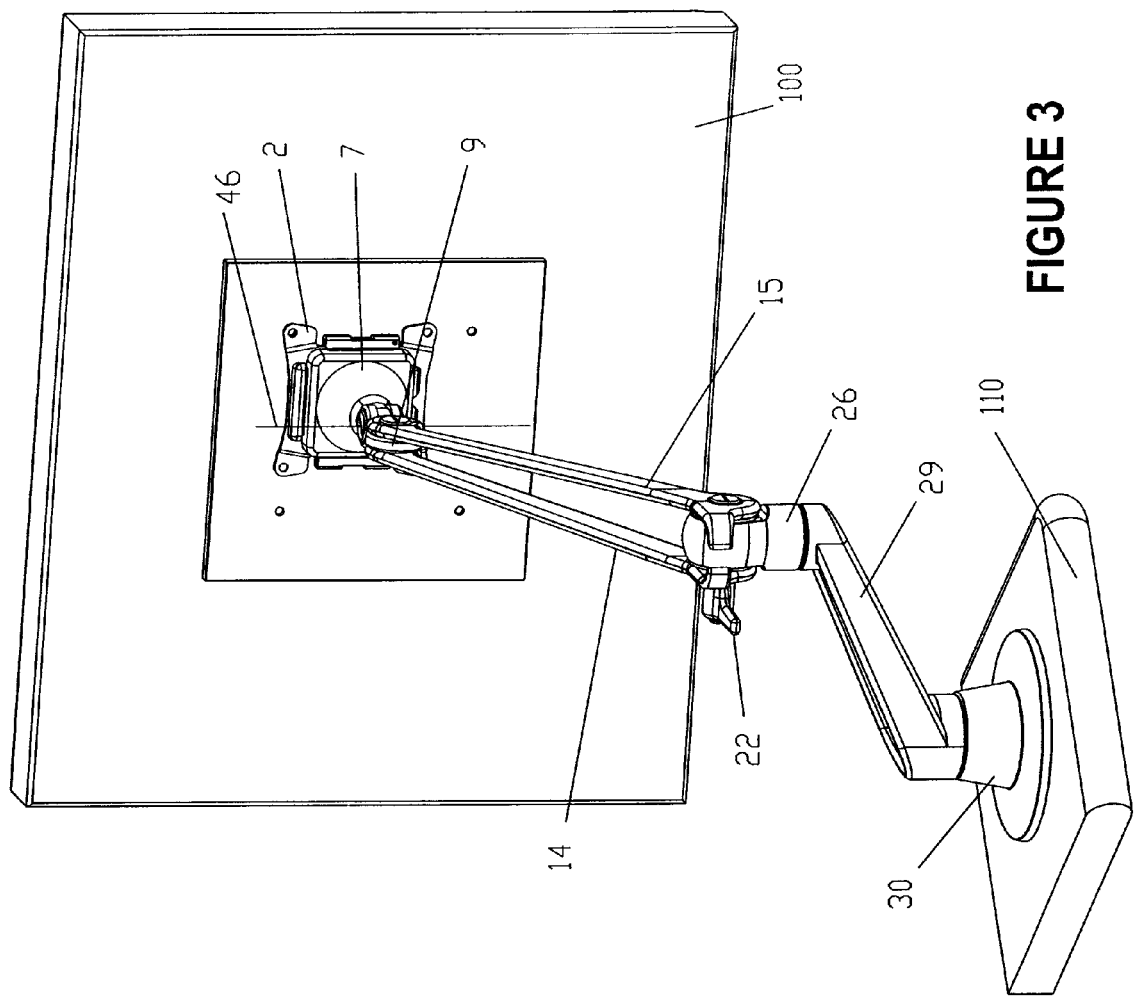
FIG. 3 is a pictorial view of another embodiment of the support apparatus.

FIG. 3 depicts the use of a monitor 100 with mounting plate 2 and cone 7. The swivel arm 9 is coupled to mounting arms 14 and 15 adjoining knuckle 26 for movement about the various axes. The lever handle 22 allows for operator controlled resistance within the TORSILASTIC, e.g. elastomeric torsion spring assembly to control the vertical placement of the monitor. The lower arm 29 is securable to a grommet 30. In this case a mounting kit which fits through the grommet hole of a desk 110 provides support for the apparatus.

It is to be understood that while we have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

We claim:

1. A support for selective positioning of a display device over a work surface comprising:

an attachment clamp for connection with a work surface, said clamp connected to a knuckle, said knuckle rotatably connected to said clamp, said knuckle rotatable about a first axis of rotation for horizontal positioning of said display device, said knuckle including an elastomeric torsion spring assembly secured to a first end of at least one arm, said elastomeric torsion spring assembly including at least one elastomeric element for providing resistance to differential rotation of said at least one arm with respect to said knuckle in a vertical direction, a second end of said at least one arm constructed and arranged to support said display device, said elastomeric torsion spring assembly providing resistance in proportion to the extent of differential rotation of said at least one arm with respect to said knuckle, said at least one elastomeric element further providing sufficient resistance to the extent of differential rotation of said at least one arm with respect to said knuckle to maintain said at least one arm in another position vertically displaced from a first position, said elastomeric torsion spring assembly includes a hand operable lever rotatably attached to said elastomeric torsion spring assembly for controlling resistance provided to said at least one arm by said elastomeric torsion assembly, whereby rotation of said lever in a first direction reduces said resistance provided by said differential rotation of said at least one arm about said second axis of rotation, whereby rotation of said lever in a second direction increases said resistance provided by said differential rotation of said at least one arm about said second axis of rotation, a portion of said elastomeric torsion spring assembly includes an external spline for interlocking engagement with said hand operable lever and wherein said hand operable lever includes an internal spline for interlocking engagement with said external spline;

whereby said lever may be pulled outwardly to disengage said splines, rotated to reposition said lever, and pushed inwardly to re-engage said splines.

2. The support for selective positioning of a display device over a work surface of claim 1 including a lower arm, said lower arm rotatably connected at a first end to said clamp and at a second end to said knuckle, wherein said lower arm is rotatable about a third axis of rotation substantially perpendicular to said work surface and wherein said knuckle is rotatable about a fourth axis of rotation substantially perpendicular to said work surface;

whereby said lower arm provides lateral offset positioning of said display device.

3. The support for selective positioning of a display device over a work surface of claim 1 wherein said second end of said at least one arm is secured to a swivel arm, said swivel arm including a first end and a second end, said first end including a second elastomeric torsion spring assembly for pivotal attachment to said second end of said at least one arm, said second elastomeric torsion spring assembly including at least one elastomeric element for providing resistance to differential rotation of said swivel arm with respect to said at least one arm, said swivel arm rotatable about a fifth axis of rotation for operator selectable vertical plane positioning of said display device, said second end of said swivel arm constructed and arranged to support said display device.

4. The support for selective positioning of a display device over a work surface of claim 3 including a swivel cone and mounting base for horizontal plane positioning about a sixth axis of rotation and rotational positioning of said display device about a fourth axis, a first end of said swivel cone being rotatably secured to said second end of said swivel arm, a second end of said swivel cone being secured to a first side of said mounting base, a second side of said mounting base being constructed and arranged for removable attachment to said display device.

5. The support for selective positioning of a display device over a work surface of claim 4 wherein said second side of said mounting base is constructed and arranged to removably secure a mounting plate, wherein said mounting plate is constructed and arranged to be secured to said display device.

6. A support for selective positioning of a display device over a work surface comprising:

an attachment clamp for connection with a work surface, said clamp connected to a knuckle, said knuckle rotatably connected to said clamp, said knuckle rotatable about a first axis of rotation for horizontal positioning of said display device, said knuckle including an elastomeric torsion spring assembly secured to a first end of at least one arm, said elastomeric torsion spring assembly including at least one elastomeric element for providing resistance to differential rotation of said at least one arm with respect to said knuckle in a vertical direction, a second end of said at least one arm constructed and arranged to support said display device, said elastomeric torsion spring assembly providing resistance in proportion to the extent of differential rotation of said at least one arm with respect to said knuckle, said at least one elastomeric element further providing sufficient resistance to the extent of differential rotation of said at least one arm with respect to said knuckle to maintain said at least one arm in another position vertically displaced from a first position, said second end of said at least one arm is secured to a swivel arm, said swivel arm including a first end and a second end, said first end including a second elastomeric torsion spring assembly for pivotal attachment to said second end of said at least one arm, said second elastomeric torsion spring assembly including at least one elastomeric element for providing resistance to differential rotation of said swivel arm with respect to said at least one arm, said swivel arm rotatable about a second axis of rotation for operator selectable vertical plane positioning of said display device, said second end of said swivel arm constructed and arranged to support said display device, a swivel cone and mounting base for horizontal plane positioning about a third axis of rotation and rotational positioning of said display device about a fourth axis, a first end of said swivel cone being rotatably secured to said second end of said swivel arm, a second end of said swivel cone being secured to a first side of said mounting base, a second side of said mounting base being constructed and arranged for removable attachment to said display device, said second end of said swivel cone includes at least one spring pin and said first side of said mounting base includes a plurality of indentations, wherein said at least one spring pin is positioned to cooperate with said indentations to permit indexable rotation of said display device about said fourth axis.

* * * * *